US008539051B2

United States Patent
Lankes et al.

(10) Patent No.: US 8,539,051 B2
(45) Date of Patent: Sep. 17, 2013

(54) METHOD FOR THE TRANSMISSION OF PROGRAM UPDATES FOR PROGRAM-CONTROLLED DEVICES IN A COMMUNICATION NETWORK

(75) Inventors: Holger Lankes, Puchheim (DE); Volkmar Rudat, Neufarn b. Anzing (DE); Stephan Schaade, Buchloe (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 989 days.

(21) Appl. No.: 12/224,730

(22) PCT Filed: Dec. 12, 2006

(86) PCT No.: PCT/EP2006/069584
§ 371 (c)(1),
(2), (4) Date: Sep. 4, 2008

(87) PCT Pub. No.: WO2007/101485
PCT Pub. Date: Sep. 13, 2007

(65) Prior Publication Data
US 2009/0049440 A1    Feb. 19, 2009

(30) Foreign Application Priority Data

Mar. 7, 2006  (DE) .......................... 10 2006 010 539

(51) Int. Cl.
*G06F 15/177* (2006.01)
*G06F 9/44* (2006.01)
(52) U.S. Cl.
USPC .......................................... 709/221; 717/172

(58) Field of Classification Search
USPC .................................. 709/221; 717/171–173
See application file for complete search history.

(56) References Cited

U.S. PATENT DOCUMENTS

| 2003/0061239 A1* | 3/2003 | Yoon .......................... 707/104.1 |
| 2004/0098421 A1* | 5/2004 | Peng ............................... 707/203 |
| 2005/0083907 A1* | 4/2005 | Fishler .......................... 370/352 |
| 2005/0207432 A1 | 9/2005 | Velez-Rivera et al. |
| 2005/0283477 A1* | 12/2005 | Donovan et al. .................. 707/8 |
| 2006/0106806 A1* | 5/2006 | Sperling et al. ................. 707/10 |
| 2007/0192763 A1* | 8/2007 | Helvick ........................ 717/168 |

FOREIGN PATENT DOCUMENTS

| CN | 1394307 A | 1/2003 |
| CN | 1421779 A | 6/2003 |
| EP | 1 290 586 A | 12/2001 |
| WO | WO 01/63482 A2 | 8/2001 |
| WO | WO 02/44833 A2 | 6/2002 |

OTHER PUBLICATIONS

Microsoft Windows XP-002423137 Deploying Microsoft Software Update Services Microsoft Corporation, Published: Jan. 2003; Book; 2003.

* cited by examiner

*Primary Examiner* — Jeong S Park
(74) *Attorney, Agent, or Firm* — Buchanan Ingersoll & Rooney PC

(57) ABSTRACT

The invention is characterized in that a user profile for a program-controlled device is updated on a regular basis. The program is updated in accordance with said user profile. One advantage of the invention lies in the fact that peak loads of communication networks caused by the simultaneous transmission of program updates are avoided.

20 Claims, 1 Drawing Sheet

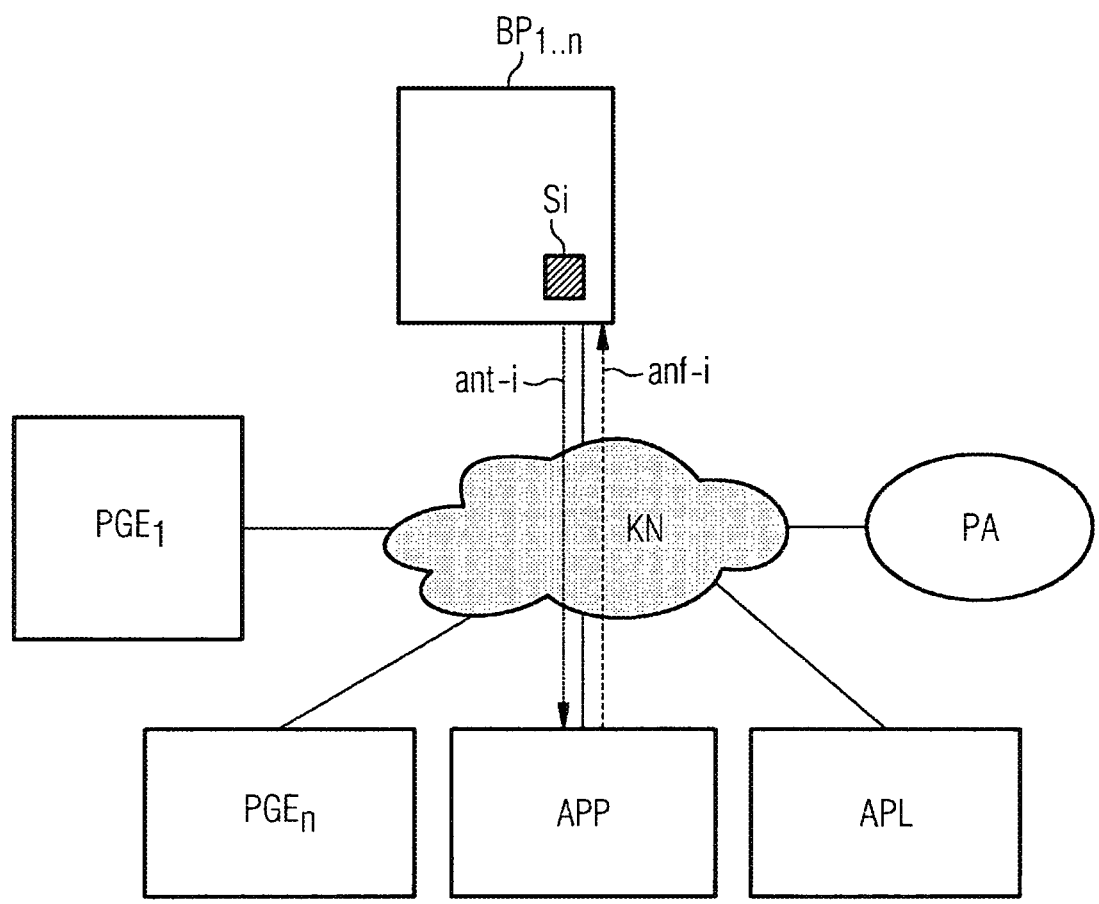

METHOD FOR THE TRANSMISSION OF PROGRAM UPDATES FOR PROGRAM-CONTROLLED DEVICES IN A COMMUNICATION NETWORK

CROSS REFERENCE TO RELATED APPLICATIONS

This application is the US National Stage of International Application No. PCT/EP2006/069584, filed Dec. 12, 2006 and claims the benefit thereof. The International Application claims the benefits of German application No. 10 2006 010 539.7 filed Mar. 7, 2006, both of the applications are incorporated by reference herein in their entirety.

FIELD OF THE INVENTION

The invention relates to a method for the transmission of program updates for program-controlled devices in a communication network.

BACKGROUND OF THE INVENTION

A large proportion of electronic devices or equipment is now program controlled (program-controlled devices). For this purpose they contain microprocessors, operating systems and software applications (programs). Examples are personal computers and telephone terminals, but also machine tools, to mention just a few. In many cases this equipment is connected to a communication network.

as a result of the increasing speed of development cycles, increasing complexity of program-controlled devices and programs, and for rectification of errors frequent updates of the underlying programs (program updates) are necessary.

To this end a program update must typically be transferred to program-controlled devices of a communication network, e.g. terminals, and activated there. If the program updating is to be performed simultaneously for many program-controlled devices this can result in high peak loads in the communication network during the simultaneous updating. This is especially the case if the program updates involve larger volumes of data.

Another factor is that program updates can in some cases not be activated without interrupting the operation of the program-controlled devices. A personal computer must thus frequently be shut down and restarted after program updating for example in order to enable the program update to be activated.

Program updates are transmitted and provided in a very wide variety of ways. Previously they were provided most frequently on data media (e.g. CD-ROM). More recently network-based program updating methods (online update) via a service access of the device or via a connection to a communication network, such as the Internet, have become increasingly widely used.

Basically three different methods are used to do this:

In a first manual method the decision about whether and when to update lies entirely in the hands of the user of the program-controlled device. In this case the user selects the program update for the program-controlled device himself via suitable means (such as an Internet Web browser) and thus starts the transmission of the program update. If required, he shuts down the program-controlled device afterwards in order to subsequently restart it so as to activate the program updating. The disadvantage here is that performing the program update lies solely in the hands of the user. This is especially problematic if important—maybe safety-relevant—program updates are not performed by the user.

A second method runs semi-automatically. In this method either a central server can inform the user about the availability of a new program update or an application that is assigned to the program-controlled device, searches automatically for available program updates, such as in the communication network. If such a program update is found, a request is sent by the application to the user asking whether he or she would like to have the program update transmitted and install it. A disadvantage of this method, particularly in corporate communication networks, is that the method results in peak loads on the communication network at the ends of the day as well as directly after provision of the program update.

A third method runs fully automatically. In this method available program updates are transmitted under central control to users without consulting the latter. The disadvantage here is that no account is taken of individual user behavior. Another problem can be that uninterrupted availability of the program-controlled device is important to the user in specific situations, but that this is disrupted by the fully-automatically execution of program updating.

A method is known from publication EP 1 290 586 A2 in which centrally-stored program updates are performed via a communication network. To this end the program update is initially stored in an external device, in order to then be transmitted to a number of decentralized devices.

An Internet-protocol-based telephone (IP phone) as a terminal is known from publication US 2005/0207432 A1. The publication envisages a terminal which is especially suited for receiving promotional information in conjunction with an integrated search function. To this end the terminal is connected to a server, with the terminal being configured to enable it to receive promotional information from this server. To this end the terminal is equipped with a memory, a processor, a receive device and a transmit device, in order to receive from this server a list of network providers and provider information that match a search request sent by the terminal.

SUMMARY OF THE INVENTION

The underlying object of the invention is to improve the transmission of program updates. The object is achieved by the characterizing features of the claims.

The important aspect of the invention is the regular updating of a user profile and a determination of an updating plan for a number of program-controlled devices. The program updating is undertaken with the aid of the determined updating plan.

The advantages of the invention are, that peak loads of communication networks caused by simultaneous transmission of program updates are avoided, that interruptions to functions and operation by the activation of the program updating are reduced.

Advantageous developments are contained in the dependent claims.

BRIEF DESCRIPTION OF THE DRAWINGS

The invention will be illustrated below on the basis of two exemplary embodiments and with reference to the enclosed drawing.

The FIGURE shows in a block diagram those components in a typical communication network KN that are necessary to explain the inventive method for transmission of program updates for program-controlled devices in a communication network.

DETAILED DESCRIPTION OF THE INVENTION

The exemplary embodiment includes program-controlled devices $PGE_{1-n}$ (e.g. IP telephones), for which a program update PA is available in the communication network KN.

To this end statistical information $si_{1-n}$ about the users of the program-controlled devices $PGE_{1-n}$ is stored and updated for the program-controlled devices $PGE_{1-n}$ in user profiles $BP_{1-n}$ arranged in the communication network KN. These can for example relate to the typical usage times of the program-controlled devices $PGE_{1-n}$, e.g. device active. Furthermore information can typically be stored indicating that the respective program-controlled device PGE will be used on a regular basis on weekdays between 8:30 and 16:00 and between 13:00 and 17:45, but never used however in the period between 20:30 and 7:00 or at the weekend or on public holidays.

Further examples of statistical information $si_{1-n}$ that can be stored in the user profiles $BP_{1-n}$ are as follows:

Upstream data volumes, i.e. the volumes of data that have been sent by the program-controlled device PGE to the communication network KN, Downstream data volume, the data volume which has been received by the of program-controlled device PGE from the direction of the communication network KN, incoming call if the program-controlled device involved is a telecommunication terminal I, outgoing call, likewise if the program-controlled device PGE involved is a telecommunication terminal, or User activity (keyboard, mouse, telephone keypad).

An application APP (in the communication network KN) administers the transmission of the program updates PA to the program-controlled devices $PGE_{1-n}$. If there is now a program update PA in the sense of a more current program available in the communication network KN, the application APP sends interrogation information anf-i via the communication network KN to the respective user profile $BP_{1-n}$ containing at least the information that a program update PA is available. Response information ant-$i_{1-n}$ is then sent to the application APP by the user profiles $BP_{1-n}$ implemented in the communication network KN containing information such as the statistical information $si_{1-n}$ relating to the usage of the program-controlled devices $PGE_{1-n}$. This statistical information si contains—as shown above—both statistical information about usage times and also further statistical information such as upstream and downstream data volume, incoming and outgoing calls and user activity.

The program update PA will then be performed on the basis of this response information, possibly depending on further parameters predetermined by the program-controlled devices $PGE_{1-n}$ or other components in the communication network KN.

It is conceivable for example for the following image to be produced for the application APP from the statistical information $si_{1-n}$ of eight interrogated program-controlled devices $PGE_{1-n}$:

two of these eight program-controlled devices $PGE_{1-n}$ are never used on a Monday, three others are never used after 14:00 on a Friday, and three others are never used after 15:00 on a Friday.

Based on this statistical information $si_{1-n}$ and on observing matches or deviations, application APP could then form a group. The program update can then be performed jointly in each case for the individual members of the groups.

Consideration of further parameters—such as the load on the communication network KN to be observed statistically—is also conceivable. In this case for example account can be taken of the fact that the communication network KN, on account of the log-on activity of many users at the start of the working day, is subjected to a particular load between 7:30-9:30.

A second exemplary embodiment relates to the transmission and subsequent activation of a program update PA to a series of program-controlled devices $PGE_{1-n}$ (e.g. personal computers) in a communication network KN of a company in accordance with an updating plan APL.

As soon as a program update PA is available for the program-controlled devices $PGE_{1-n}$ concerned, an application APP arranged in the communication network KN sends interrogation information anf-i about the availability of the program update PA to the program-controlled devices $PGE_{1-n}$. In response to this information each personal computer $PGE_{1-n}$ involved, depending on the statistical information $si_{1-n}$ stored for it in the user profile BP, sends response information ant-$i_{1-n}$, containing one or more preferred times for the execution of the program update PA. On the basis of all response information ant-$i_{1-n}$ of the program-controlled devices $PGE_{1-n}$ involved, the application APP now creates an updating plan APL, that takes into account both the preferred update times of the program-controlled devices $PGE_{1-n}$ and also the preferred update times for the individual program-controlled devices $PGE_{1-n}$ in respect of an optimum network utilization of the communication network KN. Finally the program update PA is transmitted via the communication network KN to the individual program-controlled devices $PGE_{1-n}$ and activated in accordance with this updating plan APL.

In such cases, after conclusion of the updating plan, APL an acknowledgement can optionally be sent to the users of the program-controlled devices $PGE_{1-n}$ containing the information that its program-controlled devices $PGE_{1-n}$ will be updated on day XY at time Z.

The communication networks KN involved can thus be an Intranet, the Internet, a corporate communication network or a public communication network—PSTN, with synchronization with the corresponding communication protocol to be undertaken in each case.

The user profiles can be implemented both in the program-controlled device $PGE_{1-n}$ itself in a memory provided for this purpose and also in the communication network KN—for example in a memory of a server.

The invention claimed is:

1. A method for updating a program in a program controlled device via a communication network, comprising:

an administration application causing interrogation information to be sent to one of a communication network device and at least one program controlled device via the communication network, the one of the communication network device and at least one program controlled device having at least one user profile stored in non-transitory memory, each of the at least one user profile being associated with statistical information regarding at least one program controlled device associated with that user profile, the statistical information regarding the at least one program controlled device comprising at least one of typical usage time, upstream data volume, downstream data volume, incoming call information, outgoing call information, and user activity information of the at least one program controlled device;

each of the at least one user profile sending response information to the administration application in response to the interrogation information, the response information comprising the statistical information;

the administration application receiving the response information;

in response to receiving the response information, the administration application determining an update plan for performing a program update on each of the at least one program controlled device based on the statistical information of the received response information;

the administration application sending an acknowledgement message to the at least one program controlled device upon determining the update plan, wherein the acknowledgement message comprises information that specifies that the at least one program controlled device that receives the acknowledgment message will be updated at a predetermined time;

the at least one program controlled device receiving the acknowledgement message; and performing the program update on the at least one program controlled device associated with the at least one user profile in accordance with the determined update plan that is based on the statistical information of the received response information.

2. The method of claim 1 wherein the statistical information regarding the at least one program controlled device comprises typical usage time, upstream data volume, downstream data volume, incoming call information, outgoing call information, and user activity information of the at least one program controlled device.

3. The method of claim 2 wherein the typical usage time specifies a time of day range that the at least one program controlled device is in use.

4. The method of claim 1 wherein the at least one of the communication network device and the at least one program controlled device is the at least one program controlled device and wherein the at least one program controlled device is a device selected from the group consisting of a communication terminal, a personal computer, and an electronic device.

5. The method of claim 1 wherein the at least one of the communication network device and the at least one program controlled device is the communication network device having the at least one user profile stored in a non-transitory memory located in the communication network device, and wherein the communication network device is a server.

6. The method of claim 1 wherein the communication network is an intranet, the internet, a corporate communication network, or a public communication network.

7. The method of claim 1 further comprising storing the statistical information regarding the at least one program controlled device as a portion of the at least one user profile associated with that program controlled device.

8. The method of claim 7 further comprising updating the statistical information for the at least one program controlled device and storing the updated statistical information by the at least one program controlled device.

9. The method of claim 1 wherein the at least one user profile comprises a plurality of user profiles and the at least one program controlled device comprises a plurality of program controlled devices, and wherein performing the program update comprises performing the program update on the plurality of program controlled devices according to the statistical information in the received response information sent by the plurality of user profiles.

10. The method of claim 9 wherein the plurality of program controlled devices comprises a first subset and a second subset of the plurality of program controlled devices and wherein performing the program update on the plurality of program controlled devices comprises performing the program update on a first subset of the plurality of program controlled devices and performing the program update on a second subset of the plurality of program controlled devices following performing the program update on the first subset of program controlled devices.

11. The method of claim 1 wherein the administration application determining the update plan for performing the program update further comprises evaluating a load on the communication network.

12. The method of claim 1 further comprising the administration application determining the update plan for performing the program update independent of a load on the communication network.

13. The method of claim 1 wherein the administration application determining the update plan comprises the administration application taking into account the preferred update times of the program controlled devices together and the preferred update times of the program controlled devices individually.

14. A system for updating a program in a program controlled device via a communication network, comprising:

an administration application stored on a non-transitory computer readable medium; and at least one of a computer network device and at least one program controlled device; and one of the communication network device and the at least one program controlled device having at least one user profile stored in non-transitory memory, each of the at least one user profile being associated with statistical information regarding at least one program controlled device associated with that user profile, the statistical information regarding the at least one program controlled device comprising at least one of typical usage time, upstream data volume, downstream data volume, incoming call information, outgoing call information, and user activity information of the at least one program controlled device; and the administration application causing interrogation information to be sent to the one of the computer network device and the at least one program controlled device via the communication network; and each of the at least one user profile sending response information to the administration application in response to the interrogation information, the response information comprising the statistical information; and the administration application receiving the response information; and in response to receiving the response information, the administration application determining an update plan for performing the program update on each of the at least one program controlled device based on the statistical information of the received response information; and the administration application sending an acknowledgement message to the at least one program controlled device upon determining the update plan, wherein the acknowledgement message comprises information that specifies that the at least one program controlled device that receives the acknowledgment message will be updated at a predetermined time; and the at least one program controlled device receiving the acknowledgement message; and the program update being performed on the at least one program controlled device associated with the at least one user profile in accordance with the determined update plan that is based on the statistical information of the received response information.

15. The system of claim 14 wherein the at least one of the computer network device and the at least one program controlled device updates the statistical information that corresponds to the at least one user profile of the at least one of the computer network device and the at least one program controlled device.

16. The system of claim 14 wherein the at least one of the communication network device and the at least one program controlled device is the at least one program controlled device having at least one user profile and wherein the at least one program controlled device is a device selected from the group consisting of a communication terminal, a personal computer, and an electronic device.

17. The system of claim 14 wherein the at least one of the communication network device and the at least one program controlled device is the communication network device and wherein the communication network device is a server.

18. The system of claim 14 wherein the statistical information regarding the at least one program controlled device comprises typical usage time, upstream data volume, downstream data volume, incoming call information, outgoing call information, and user activity information of the at least one program controlled device.

19. The system of claim 18 wherein the typical usage time specifies a time of day range that the at least one program controlled device is in use.

20. A method for updating a program in a program controlled device via a communication network, comprising:
   an administration application causing interrogation information to be sent to at least one program controlled device via the communication network, the at least one program controlled device having at least one user profile stored in non-transitory memory, the at least one user profile being associated with statistical information regarding the at least one program controlled device associated with the at least one user profile;
   the at least one program controlled device sending response information to the administration application in response to the interrogation information, the response information comprising at least one preferred time for performing a program update on the at least one program controlled device, wherein the at least one preferred time for performing the program update is determined by the at least one program controlled device based on the statistical information;
   the administration application receiving the response information;
   in response to receiving the response information, the administration application determining an update plan for performing a program update on the at least one program controlled device based on the received response information; and
   the administration application sending an acknowledgement message to the at least one program controlled device upon determining the update plan, wherein the acknowledgement message comprises information that specifies that the at least one program controlled device that receives the acknowledgment message will be updated at a predetermined time, the predetermined time matching the at least one preferred time for performing the program update determined by the at least one program controlled device based on the statistical information; and
   the at least one program controlled device receiving the acknowledgement message; and
   performing the program update on the at least one program controlled device associated with the at least one user profile in accordance with the determined update plan that is based on the received response information.

* * * * *